United States Patent
Izhak-Ratzin et al.

(10) Patent No.: US 10,237,148 B2
(45) Date of Patent: Mar. 19, 2019

(54) PROVIDING A DATA SET FOR TRACKING AND DIAGNOSING DATACENTER ISSUES

(71) Applicant: Robin Systems, Inc., Milpitas, CA (US)

(72) Inventors: Rafit Izhak-Ratzin, Los Gatos, CA (US); Shravan Kumar Vallala, San Jose, CA (US); Alon Pelled, Sunnyvale, CA (US); Krishna Satyasai Yeddanapudi, Pleasanton, CA (US)

(73) Assignee: ROBIN SYSTEMS, INC., San Jose, CA (US)

( * ) Notice: Subject to any disclaimer, the term of this patent is extended or adjusted under 35 U.S.C. 154(b) by 362 days.

(21) Appl. No.: 14/886,638

(22) Filed: Oct. 19, 2015

(65) Prior Publication Data

US 2016/0112288 A1   Apr. 21, 2016

Related U.S. Application Data

(60) Provisional application No. 62/065,472, filed on Oct. 17, 2014.

(51) Int. Cl.
*H04L 12/26* (2006.01)
*H04L 12/24* (2006.01)

(52) U.S. Cl.
CPC ............ *H04L 43/04* (2013.01); *H04L 43/065* (2013.01); *H04L 43/0882* (2013.01); *H04L 41/12* (2013.01); *H04L 43/0817* (2013.01)

(58) Field of Classification Search
None
See application file for complete search history.

(56) References Cited

U.S. PATENT DOCUMENTS

| | | | | |
|---|---|---|---|---|
| 2012/0226492 A1* | 9/2012 | Tsuboi | ............ | G06F 17/2785 704/9 |
| 2014/0032787 A1* | 1/2014 | Avasthi | ............ | G06F 1/3203 710/6 |
| 2014/0126573 A1* | 5/2014 | Matthews | ............ | H04L 43/065 370/389 |
| 2014/0172371 A1* | 6/2014 | Zhu | ............ | G06F 11/0709 702/185 |
| 2016/0063401 A1* | 3/2016 | Stachel | ............ | G06Q 10/067 705/7.23 |

\* cited by examiner

*Primary Examiner* — Adnan Baig
(74) *Attorney, Agent, or Firm* — David R. Stevens; Stevens Law Group (57) ABSTRACT

Systems and methods are disclosed for aggregating data capable of diagnosing unique datacenter issues. Traffic statistic collection may be moved from intermediate, datacenter nodes to end hosts providing reports for aggregation and correlation with events at an analytic controller, uncovering implications for such events. To track metrics and/or diagnose datacenter issues not addressed in traffic statistics, information locally available to the end hosts may be combined and/or correlated with traffic statistics. Examples may involve information about: virtual and physical computing resources; a sub-cluster; an application and/or process utilized by a datacenter task; a task/job type; an implementation phase; an initiating user; a task priority; link utilization and/or other traffic statistics relative to the foregoing. Also, for efficiency purposes, the analytic controller may apply a hash to map a virtual to a physical IP address in determining a datacenter path based on topology limited to a physical network, saving computational expense.

17 Claims, 7 Drawing Sheets

PROVIDING A DATA SET FOR TRACKING AND DIAGNOSING DATACENTER ISSUES

RELATED APPLICATIONS

This application claims the benefit of U.S. Provisional Application Ser. No. 62/065,472, filed on Oct. 17, 2014, which is incorporated herein in its entirety.

FIELD OF THE INVENTION

This invention relates to datacenters and, more particularly, to generating data to track metrics for datacenter utilization and/or diagnosing issues arising in datacenters.

BACKGROUND OF THE INVENTION

Owing to the distributed nature of the resources they offer, datacenters can be viewed, from one vantage point, as networks. In accordance with this first viewpoint, statistics about network traffic may measure some aspects of datacenter performance and may diagnose some problems in datacenters. However, datacenters can also function as a coordinated whole in providing parallel processing and/or storage services. A second, more comprehensive, viewpoint can be advisable to take into account this coordination, together with non-network computing resources, various characteristics of tasks and/or portions of tasks performed by datacenters, and/or other considerations, such as task priorities, at play in an engaged datacenter.

In addition to the interrelated nature of nodes in a datacenter, the sheer size of datacenters can make traditional approaches to providing data problematic just with respect to network traffic. Additionally, salient metrics relevant to the performance and/or problems associated with a datacenter may be unrelated to the networks in general. Classifications describing tasks engaged in by a datacenter, and/or implementation details for those tasks, often are not present in traditional traffic statistics and/or cannot be collected by existing techniques. As a result, data to more fully characterize performance and diagnose issues in datacenters are not available.

BRIEF DESCRIPTION OF THE DRAWINGS

In order that the advantages of the disclosures will be readily understood, a more particular description will be rendered by reference to specific embodiments illustrated in the appended drawings. Understanding that these drawings depict only typical examples and are not, therefore, to be considered limiting in scope, the invention will be described and explained with additional specificity and detail through use of the accompanying drawings, in which.

DETAILED DESCRIPTION

It will be readily understood that the components of the present invention, as generally described and illustrated in the figures herein, can be arranged and designed in a wide variety of different configurations. Thus, the following more detailed description, as represented in the figures, is not intended to be limiting in the scope, as claimed, but is merely representative of certain examples. The presently described examples will be best understood by reference to the drawings, wherein like parts are designated by like numerals throughout. In some cases, particular instances of an element may be identified with a number followed by a letter, where the letter may change from figure to figure, indicating differing instances of the element with the same or slightly varying attributes. References to elements by number only may refer more generally to a class of such elements.

Apart from implementing highly complex networks, datacenters can enlist resources of many different types to accomplish different stages and/or varieties of distributed-processing and/or storage objectives that extend beyond traditional network metrics. As a consequence of the integration between such resources, the complexity of the networks involved, and/or the large volumes of data handled, datacenter diagnostics and/or more informative datacenter-performance measurements call for more inclusive, nuanced, and/or scale resilient data sets. Some of the limitations of traditional approaches to collecting network data sets that prevent collection of a data set meeting datacenter needs are discussed with respect to the following figure.

Figure 1:
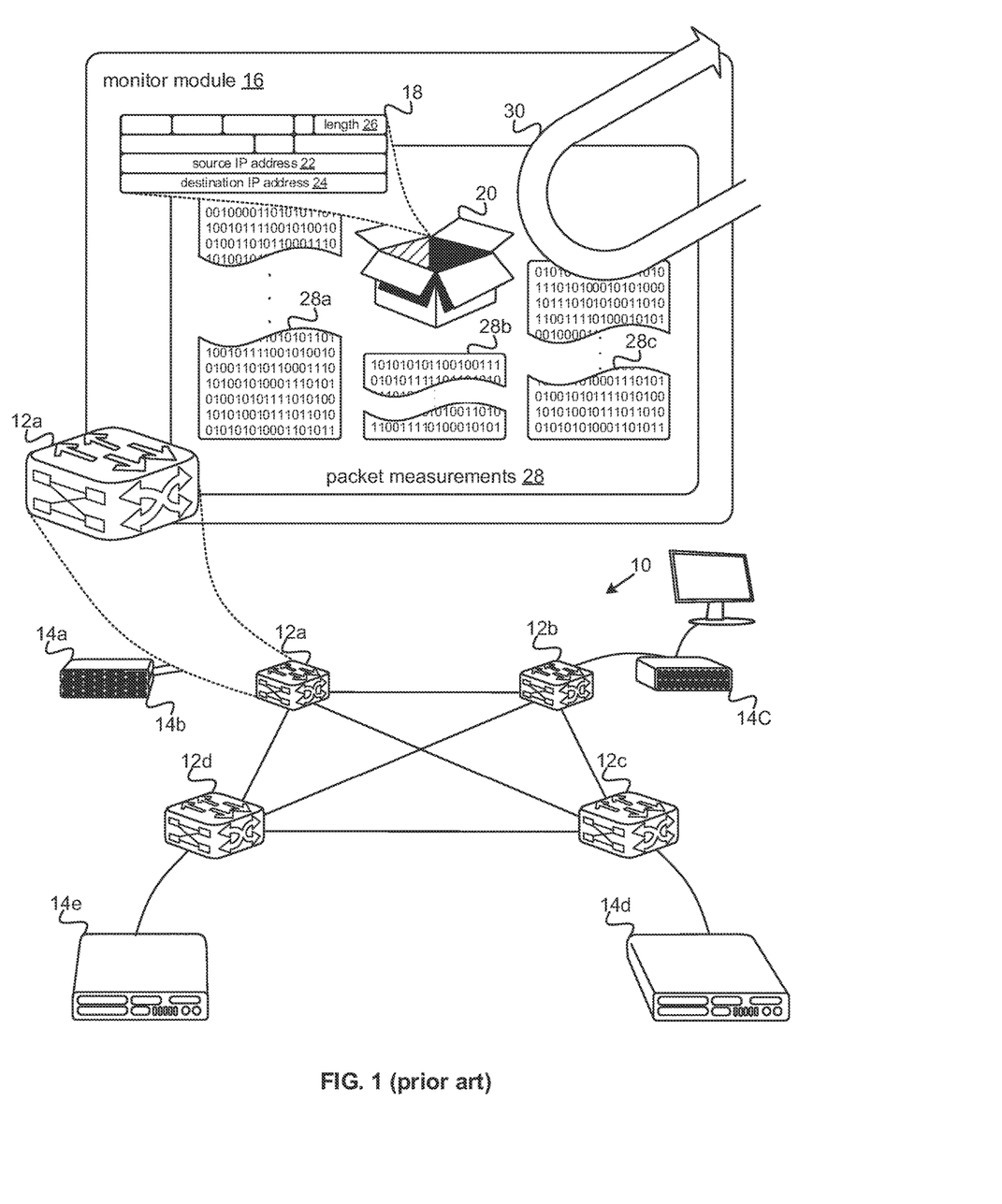
FIG. 1 is a schematic block diagram representative of traditional approaches to collecting data, from intermediate, network nodes, that can be used to generate traffic statistics for a network, in accordance with prior art.

Referring to FIG. 1, a network 10 is depicted with intermediate nodes 12a-d, such as a switch, a router, a hub, or the like and/or a load balancing server, a mirror server, or the like. The network is also depicted with various end hosts 14a-e operable to send and/or to receive data from and/or to one another. An enlarged view of one of those intermediate nodes 12a is depicted together with a monitoring module 16 residing thereon.

Such monitoring modules 16 are commonly operable to read the header 18 of packets 20 traversing the intermediate node 12a. Consequently, the monitoring module 16 is limited with respect to the kinds of data it can collect to data available in a header 18. Examples of such categories of data may include source, Internet Protocol (IP) addresses 22, destination, IP addresses 24, and total lengths 26 of packets 20 examined. However, the limited categories of data available in such headers 18 do not extend to significant types of resources and/or categorizations at play in the implementation of datacenter tasks. Furthermore, since the monitoring module 16 collects and/or stores data transmission information as packet measurements 28 at a packet level of granularity, the monitoring module 16 can store enormous amounts of data with its packet measurements 28, which may or may not be stored in groups 28a-c by the sources and/or destinations from and/or to which the packets 20 are sent.

The intermediate node 12a and/or the monitoring module 16 may then be polled 30, together with additional nodes/monitoring modules 12/16, to collect a data set tracking data transmissions across the network 10. In cases where path determinations are made for individual packets 20 at individual intermediate nodes 12, a complete characterization of datacenter traffic can involve packet-level collections at individual intermediate nodes 12 and comprehensive polling 30 of those nodes 12. When data is collected and/or aggregated for each packet 20, or at the packet level, the resultant data set can be enormous and/or require the transmission of large amounts of reporting data. Consequently, such data sets are problematic for generating practical, useful, and/or relevant traffic statistics. Additionally, polling 30 of intermediate nodes 12, as opposed to the end hosts 14 from which packets 20 originate, inherently introduces delays. Furthermore, such approaches require monitoring capabilities almost uniformly across the intermediate nodes 12 of a datacenter 10, capabilities that are expensive and not present on all potential equipment.

To addressee problems and obstacles such as those discussed above, several innovations are disclosed herein. With respect to the collection of a data set inclusive of several integral categories of resources, tasks, phases of implementation and the like for datacenter, several technologies are disclosed herein. The following figure introduces non-limiting examples of such extra-network resources and/or classifications such improved data sets may reflect.

Figure 2:
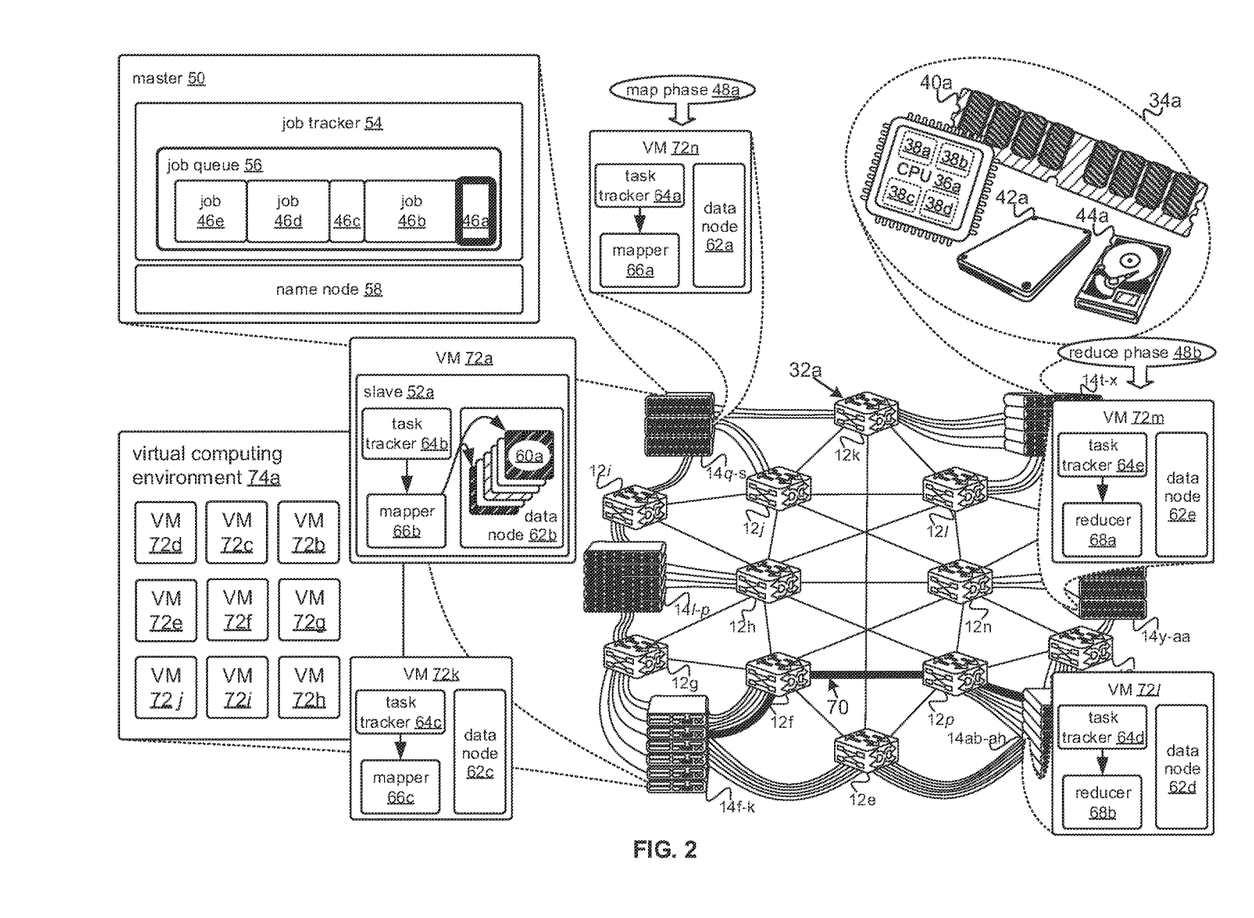
FIG. 2 is a schematic block diagram of a datacenter, highlighting exemplary, non-limiting aspects extending beyond the datacenter's nature as a network, including: virtual computing resources; different jobs and job types; different implementation phases; different applications; and different hardware resources at end hosts, in accordance with examples.

Referring to FIG. 2, a datacenter 32a is depicted. The datacenter 32a may implement a network with intermediate nodes 12e-p linking multiple end hosts 14f-ah in the datacenter 32a. Such end hosts 14f-ah may be operable to store and/or process data. The end hosts 14f-ah may include one or more Network Interface Controllers (NICs) operable for data transmission across the datacenter 32a in accordance with a common, coordinated task undertaken by the datacenter 32a. An end host 14 may be thought of as a server. Although individual end hosts 14 depicted herein may include multiple physical servers, they may be referred to herein as though they included a single server for ease of explanation, but not for limitation of the disclosure.

Also depicted with the datacenter 32a, however, are several exemplary, non-limiting aspects of the datacenter 32a and/or the tasks performed by the datacenter 32a that extend beyond the datacenter's 32a characteristics as a network. Multiple end hosts 14f-ah including hardware networked in the datacenter 32a may provide distributed, computing resources for distributed, parallel processing and/or storage engaged in by the datacenter 32c. For example, individual end hosts 14 may include a set of hardware elements 34a that support processing and/or storage services at the corresponding end-host node 14 of the datacenter 32a. By way of a non-limiting example, an exemplary set of hardware elements 34a may include: one or more Central Processing Units (CPUs) 36a, with one or more cores 38a-d; one or more Random Access Memory (RAM) units 40a; one or more Solid State Drives 42a; and/or one or more Hard Disk Drives (HDDs) 44a, among other potential hardware elements.

One or more of the hardware elements 34a may provide resources for distributed processing and/or storage during the integrated execution of a job 46 in the datacenter 32a. One or more of such hardware elements may result in and/or contribute to a bottleneck and/or have performance issues for the execution of a datacenter job 46. Although hints about such issues may be indirectly buried within traffic statistics for the datacenter's network, usage information for one or more of the hardware resources 34a may improve the detail and/or reliability of performance measurements and/or diagnostic capabilities. Any additional load on the datacenter's network in providing such information, however, may constitute a significant concern, as may the relationship between such information and other categories descriptive of datacenter activities.

Also depicted are multiple jobs 46a-e provided for execution at the datacenter 32a. The jobs 46a-e may vary in size and/or type and may involve different phases 48a-b. Similarly, the datacenter 32b may also engage in different tasks, which themselves may vary in size and/or type. Also, the datacenter 32a may be configured to run one or more different platforms, applications, or programs. By way of example and not limitation, the jobs 46a-e and phases 48a-b discussed above are presented in FIG. 2 as pertaining to a MapReduce environment implemented within the datacenter 32a, such as, by way of example and not limitation, HADOOP. As can be appreciated, other approaches to parallel processing and/or storage are possible, such as, without limitation, CASSANDRA and OPENSTACK. Within a MapReduce environment, a cluster of nodes implementing a hierarchical architecture may be divided between a master node 50 and multiple slave nodes 52.

The master node 50 may include a job tracker 54 having a job queue 56 with one or more jobs 46a-e for MapReduce processing. Additionally, the master node 50 may include a name node 58 that may manage the namespace for a Distributed Filing System (DFS) provided for the MapReduce environment. The MapReduce environment may receive a job 46, in terms of a large data set, file, and/or set of files, which it may break into many different blocks and/or replicas thereof 60 for storage at data nodes 62a-e provided by slave nodes 52. The DFS may provide awareness, or location information, of the various locations/data nodes 62a-e at which the various blocks of data and/or replicas 60 thereof are stored.

Slave nodes 52 may also include one or more task trackers 64a-e. The job tracker 54 may be operable to coordinate with the task trackers 64a-e to run tasks involved in MapReduce processing. For example, during a map phase 48a, the job tracker 54 may coordinate with a set of task trackers 64a-c to run a set of mappers 66a-c in parallel to perform map tasks by applying mappers 66a-c to individual data blocks/replicas 60 stored at corresponding data nodes 62 and/or nearby data nodes 62, where a corresponding mapper 66 is occupied or otherwise unavailable.

A mapper 66 may apply itself to a block of data 60 by treating the data as a set of key-value pairs to produce a new, intermediate set of key-value pairs, wherein the intermediate keys may reflect, for example, a number of references to various values by the corresponding original keys. The intermediate files may be shuffled during a shuffle phase (not shown) to additional data nodes 62*d-e* for combination during a final reduce phase 48*b*. As with the mappers 66*a-c*, the job tracker 54 may coordinate another set of task trackers 64*d-e* to apply a set of reducers 66*a-b* to the intermediate data files.

As can be appreciated, the various phases 48, such as the map phase 48*a*, shuffle phase (not shown), the reduce phase 48*b*, and/or the like can involve the transmission of data. These transmissions of data can take place within the datacenter 32 to and/or between different end hosts 14 and the nodes 50/52 within the cluster supporting the MapReduce environment. Within the datacenter 32*a*, these transmissions of data can be carried out by traffic flows 70 and/or the processes implemented at end hosts 14 responsible for such traffic flows 70. For purposes of this application, a traffic flow 70 is defined as a series of interrelated frames, and/or packets, sent from a common source to a common destination in the datacenter 32. An example of a traffic flow 70 is depicted by the thick dark lines traversing the datacenter 32*a*. A process running at an end host 14 may transmit data to differing destinations and or with different ports. Consequently, a single process may initiate multiple traffic flows with differing destinations and/or ports. Useful information about a data center 32 may be obtained by correlating traffic information and/or additional information to a traffic flow 70, a process, or both.

Individual nodes 50/52 within a MapReduce environment, or some other processing and/or storage platform, may be implemented directly as a physical node. In many examples, however, such as those consistent with the depiction of FIG. 2, these nodes 50/52 may reside with one or more virtual computing instances 72*a-n*. In some, but not necessarily all examples, virtual computing instances 72 may be implemented as Virtual Machines (VMs).

In examples with virtual computing instances 72*a-l*, an underlying end host 14*k* may support, and provide the underlying physical hardware for, a virtual computing environment 74. As can be appreciated, the virtual computing environment 74 depicted does not include a hypervisor, consistent with, for example, an Operating-System (OS)-virtualization environment. However, in alternative virtual computing environments incorporating a hypervisor, such as a type-one or a type-two hypervisor, one or more individual virtual computing instances 72 may be provided with an individual guest operating system.

Correlating information about hardware resources 34, applications, tasks, jobs 46, phases 48, virtual infrastructure, traffic and/or the like with each other resources can be useful in anticipating datacenter responses and/or needs for particular jobs 46, phases 48, tasks, and/or the like. Again, however, the manner in which information is provided, its impact on the datacenter 32*a*, and or the way in which it is integrated with traffic, hardware-resources 34, and/or other data present outstanding issues.

A brief overview outlining some concepts that may be applied to address these issues is set forth below. A system for providing datacenter-centric and/or job-centric data sets with information on datacenter performance metrics, for diagnosing datacenter issues, and/or tracking datacenter usage may account for many different resources and classifications. The complexity of datacenters 32, which may include tens of thousands to hundreds of thousands of servers, or more, may lead to issues with traffic between servers at end hosts 14 and/or other nodes 12.

However, the complexity of networks implemented in datacenters 32 and/or the volumes of data transmitted within them may result in the collection of unwieldy data sets. As discussed above, unlike other networks 10, data transmissions in a datacenter 32 can be characterized in terms of individual traffic flows/processes 70. In traffic flows 70, a series of packets 20 can be sent from a common source to a common destination, consistent with a connection based approach to packet switching. Furthermore, a predetermined path of edges and nodes traversed through the data center may be enforced for a traffic flow 70 with a given source and destination.

Hence, the ability to characterize and collect data about data transmissions at the traffic-flow level, potentially also in terms of the edges and nodes traversed by such traffic flows, can have the advantage of significantly reducing the size of traffic-information data sets. In some examples, it may be helpful to characterize the data at a processes level, or near process level. Such data sets may be reduced in comparison to data sets collected at the packet level. In contradistinction to traditional approaches to collecting traffic information at intermediate nodes 12, information about traffic flows 70 and/or processes may be acquired at the end hosts 14 from which they originate. For example, a send call, or the like, to send data may provide source information, destination information, a Process IDentification (PID), and/or a length of the data to be sent.

Therefore, a system providing datacenter-centric data sets may include multiple flow agents, each flow agent residing at an end host 14. Such a flow agent may include a traffic module operable to correlate an amount of traffic sent from the end host 14, between a common source-destination pair to information about the source-destination pair. The traffic module may be operable to correlate an amount of traffic scheduled to a traffic flow and/or a process. For example, and without limitation, such a traffic module may correlate an amount of traffic sent to a source, physical IP address for a corresponding end host 14 at which the flow agent resides and/or to a destination, physical IP address for a destination end host 14 to which the traffic is sent. The traffic module may, in some non-limiting examples, also correlate the amount of traffic sent to a PID.

Furthermore, as opposed to intermediate nodes 12 that often have limited computing resources, end hosts 14 may provide resources to host such flow agents, regardless of make and/or model. Also, end hosts 14 do not inherently involve delays between the time traffic is scheduled and the time it arrives at an intermediate node 12. A flow agent may also include a local-information module.

A local-information module may be operable to access job-implementation information locally available at the corresponding end host 14 for a common, coordinated job 46 engaged in by the datacenter 32. Additionally, the flow agent may include a report module. The report module may be operable to combine the amount of traffic sent correlated with the traffic flow and/or process with the job-implementation information in a log file. Examples of such job-implementation information may include, without limitation, categories of information introduced above, such as information about hardware resources 34, applications, tasks, jobs 46, phases 48, virtual infrastructure, and/or the like, such as, without limitation, clusters, users, and/or assigned priorities.

Going to the trouble of combining such end-host-localized, job-implementation information, which is extraneous to networks generally, with network information, adds overhead and load to the network. Such approaches also contradict reasons why traffic statistics are traditionally collected at intermediate nodes. Without a realization of the integrated nature of datacenter operations, such an approach would not be considered. However, because of this integration, the inclusion of such job-implementation information may be harnessed to provide unique performance-metric information and/or to diagnose issues in datacenters 32. Details are discussed below with respect to the following figures.

Figure 3:
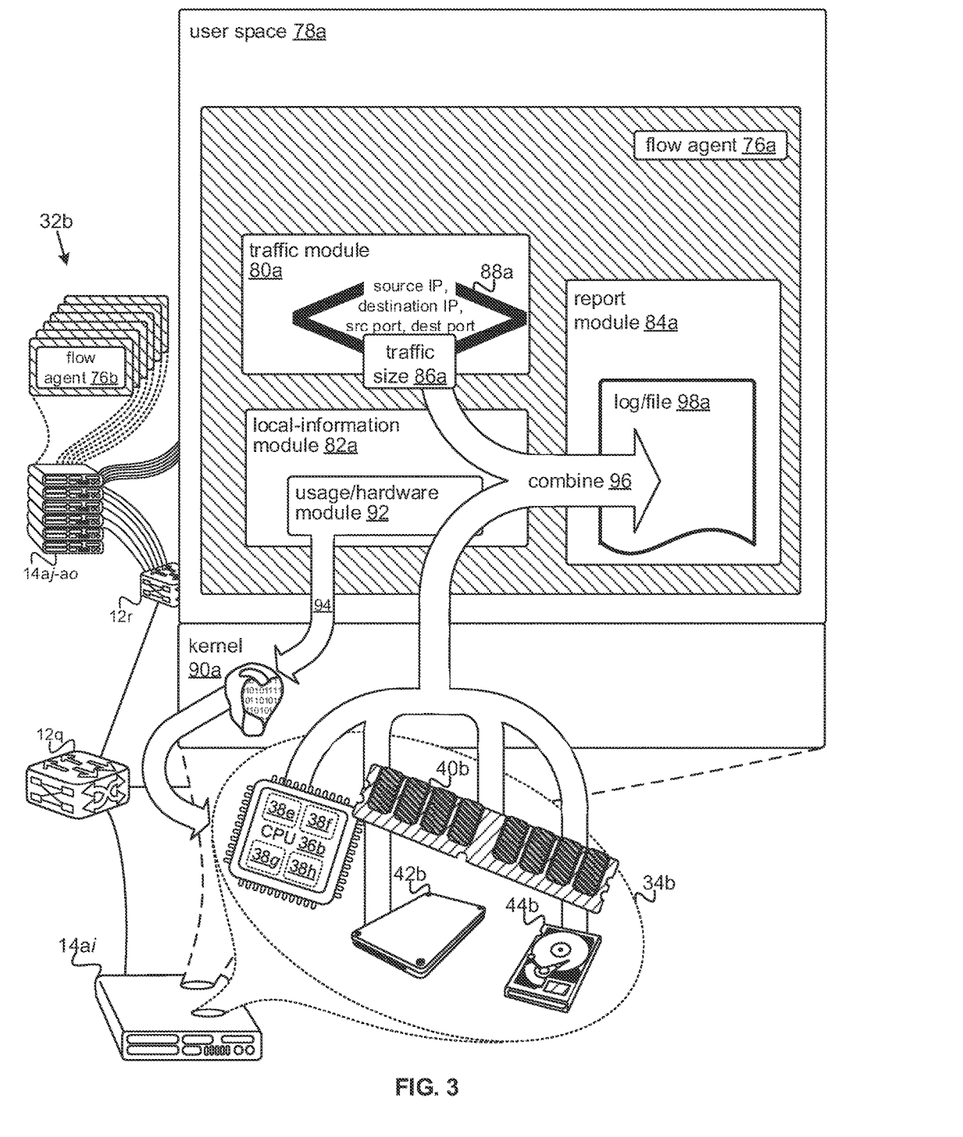
FIG. 3 is a schematic block diagram of flow agents deployed at multiple end-hosts within a datacenter to collect traffic information from the end hosts and combine the traffic information with datacenter-task-implementation information local to the end hosts, in accordance with examples.

Referring to FIG. 3, a flow agent 76a is depicted. The flow agent 76a may be implemented in user space 78a at an end host 44ai within a datacenter 32b. Additional flow agents 76b-g may also be assigned individually to other end hosts 14aj-ao interconnected by intermediate nodes 12q-r within a datacenter 32b. The expanded view of the first flow agent 76a facilitates additional discussion that may apply to one or more of the additional flow agents 76b-g as well.

A flow agent 76a may be provided with a traffic module 80a, a local-information module 82a, and/or a report module 84a. As can be appreciated, much of the structure and functionalities discussed with respect to flow agents 76, and/or other elements disclosed herein, may be provided by modules. Throughout this application, the structure and/or functionalities discussed herein may be described and/or handled by modules. Modules may take the form of an entirely hardware embodiment, an entirely software embodiment (including firmware, resident software, micro-code, etc.), or an embodiment combining software and hardware aspects. Furthermore, aspects of the presently discussed subject matter may take the form of a computer program product embodied in any tangible medium of expression having computer-usable program code.

With respect to software aspects, any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that may contain, store, communicate, propagate, or transport the program for use by or in connection with the instruction execution system, apparatus, or device.

Computer program code for carrying out operations of the present invention may be written in any combination of one or more programming languages, including an object-oriented programming language such as C++, and conventional procedural programming languages, such as the "C" programming language, or similar programming languages. Aspects of a module that are implemented with software may be executed on a micro-processor, Central Processing Unit (CPU) and/or the like. Any hardware aspects of the module may be implemented to interact with software aspects.

Returning to the modules introduced above, a traffic module 80 may collect information about traffic sent from one or more applications running in user space 78 at an end host 14 at which the corresponding flow agent 76 resides. For example, the traffic module 80a may collect information about an amount of traffic scheduled and/or sent 86a in one or more traffic flows and/or processes 70 from the end host 14ai where an individual traffic flow 70 and/or process has a common source-destination pair 88a.

A traffic flow 70 and/or process may have a combination of source-destination information 88a. For example and without limitation, such source-destination information 88a may comprise a unique tuple, such as, by way of a non-limiting example, the four tuple: <source IP, destination IP, source port, destination port>88a. In other examples, the source-destination information 88a may comprise, by way of a non-limiting example, a unique tuple as a three tuple, the three tuple comprising: <source IP, destination IP, source port, a Process Identification (PID)>. A traffic module 80a may combine, correlate, and/or index various amounts of traffic scheduled/sent 86 to different units of source-destination information 88 for different traffic flows 70 sending the amounts of traffic 86.

The traffic module 80a may correlate information, such as an amount of traffic 86 and/or other additional information, described in the following paragraph, with a traffic flow 70 or a process to produce a data set that may be engaged in terms of traffic flows 70 and/or processes. Since the nature of traffic flows 70 and processes differ, as described above, the traffic module 80a may describe a traffic flow 70 and a process in terms of different types of information for the two categories. For example and without limitation, the traffic module 80a may correlate a traffic flow 70 with an amount of traffic 86, and/or other additional information, in terms of source and destination IP addresses and/or source and destination ports. With respect to a process, the traffic module 80a may correlate a process with an amount of traffic 86 and/or additional information in terms of a source and destination IP address and/or a (PID).

In addition to traffic information collected at the end host 14ai, information about datacenter resources at the end host 14ai and/or categories relevant to the implementation of a datacenter job 46 may also be available at the end host 14ai. Throughout this application, references are made to phrases such as: "additional job-implementation information," "additional information local to an end host 14," information about an "aspect of the distributed, parallel processing job," and/or the like. Such references refer to information separate and apart from a source, a destination, 88 and an amount of traffic scheduled 86 for a traffic flow, information of applicability to networks generally. Such references refer to additional types of additional information about aspects of the datacenter 32 that provided coordinated processing and/or storage.

The local-information module 82a may access additional information local to the end host 14ai about a distributed job 46 executed by the datacenter 32b. For example, the local-information module 82a and/or an identification module 118 may be operable to locally access an identifier correlated with a traffic flow/process 70. Without limitation, the identifier may be, in some examples, a Process IDentifier (PID). The local-information module 82a and/or an identification module 118 may utilize the PID to acquire job-implementation information, such as values for a job-related property correlated and/or indexed to the PID in information maintained by the local-information module 82a and/or an identification module 118.

By way of another-example, and without limitation, an end host 14ai may be provided with an operating system, and/or operating-system kernel 90a, supporting hardware resources 34b at the corresponding end host 14ai. The local-information module 82a and/or a usage/hardware module 92 may be operable to access at least a portion of the job-implementation information available at and/or local to the end host 14ai by querying 94 the operating system/kernel 90a. One or more of such hardware resources 34b may be involved in executing a datacenter job 46 and may, therefore, play a role in the performance of the datacenter 32b and/or result in one or more issues for execution of the datacenter job 46. By way of example and not limitation, the local-information module 82a and/or a usage/hardware module 92 may query 94 the operating system/kernel 90 for hardware-resource usage data/statistics for one or more of the hardware resources 34b to which the operating system/kernel 90 may provide an interface.

Examples of such hardware resources 34b may include: one or more CPUs 36b, with one or more processing cores 38e-h; one or more RAM units 40b; one or more SSDs 42b; and/or one or more HDDs 44b. However, as can be appreciated, other examples of potential hardware elements are also possible. The local-information module 82a and/or a usage module 92 may receive a response, to one or more queries 94, from the operating system/kernel 90, which may include, without limitation, usage data for the various hardware resources 34b and/or other information, such as, without limitation, information that may be used to correlate the usage data with one or more traffic flows 70/processes.

The hardware/usage module 92 may provide a set of hardware usage data/statistics for inclusion in a report/log file 98a. The report module 84a may receive and/or access information from the traffic module 80a and the local-information module 82a, which may include the usage/hardware module 92 and/or other modules. The report module 84 may combine 96 the information from both the traffic module 80a and the local-information module 82a in the log file 98a. For example, and without limitation, the report module 84a may combine 96 the amount of traffic sent 86a and/or scheduled to be sent 82a for a given traffic flow 70 and/or process with the accompanying source-destination information 88a, from the traffic module 80a together with the additional job-implementation information, from the local-information module 82a, in the log file 98a.

The report module 84a at the flow agent 76a, together with report modules 84 at other flow agents 76b-g throughout the datacenter 32b may send log files 98 to a common analytic controller for aggregation into a data set. Additionally, and/or in the alternative, the report modules 84 may make the log files 84 available for retrieval by the common analytic controller for aggregation into a data set. In some examples, the analytic controller may provision the large data set itself for distributed processing. Such distributed processing may sort through the information in the data set about traffic and coordinated processing activities for a datacenter to facilitate the diagnosing of issues arising in datacenters, uncover the implications for traffic and/or coordinated processing that arise from different events in the datacenter, and/or generally promote improved understanding of datacenter dynamics. By way of example and not limitation, such distributed processing may be implemented as a MapReduce environment, such as, by way of example and not limitation, HADOOP. As can be appreciated, other approaches to distributed processing are also possible, such as, without limitation, CASSANDRA and OPENSTACK. The common analytic controller is discussed in greater detail below.

In some examples, a report module 84 may add the additional local information, such as, without limitation, hardware usage information, to a log file 98 without linking the additional local information to a traffic flow/process 70. In certain examples, however, a report module 84 my correlate and/or index the additional local information to one or more traffic flows 70 and/or processes, such as, for example, by linking the additional local information to source-destination information 88 for one or more traffic flows 70. Furthermore, in some examples, the report module 84 may index the local information to a physical IP address for an end-host destination of a traffic flow 70, or of a process. Exemplary, non-limiting details of how the report module 84 may perform such correlating and/or indexing are discussed below.

Figure 4:
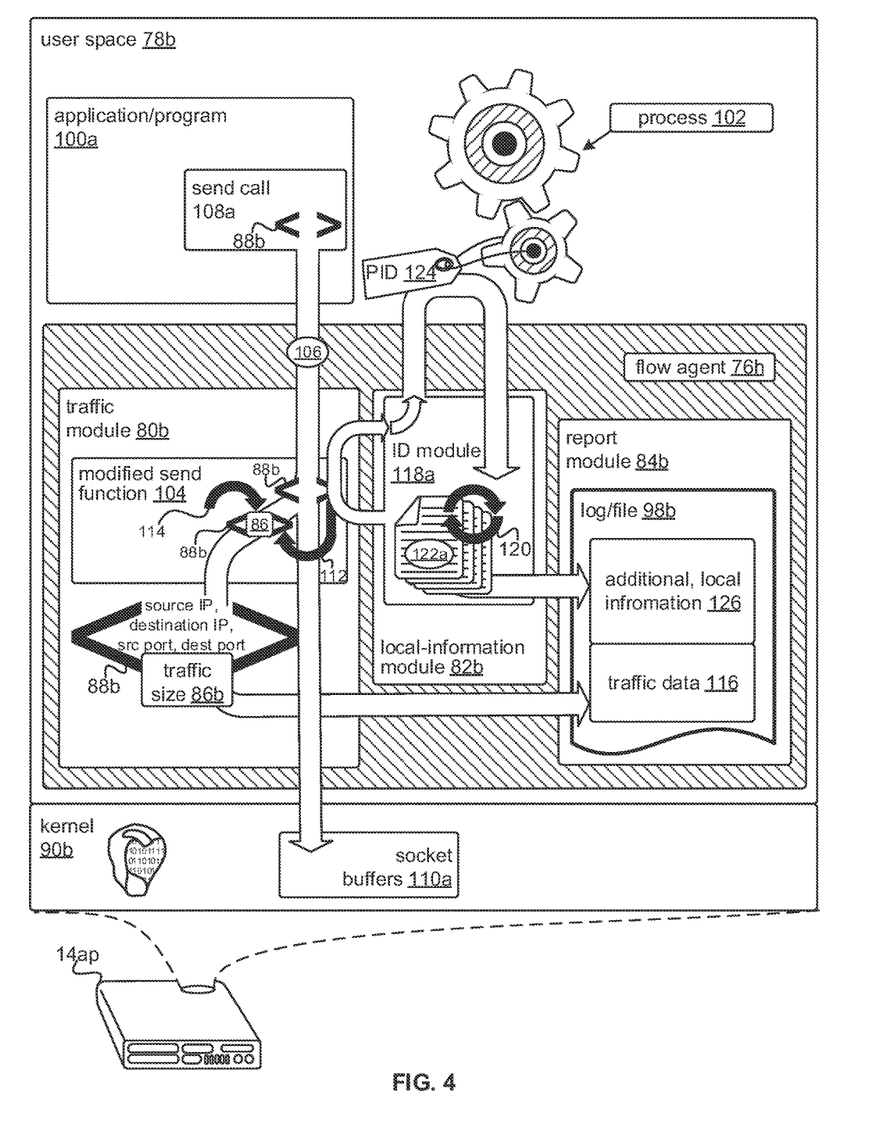
FIG. 4 is a schematic block diagram of traffic and local-information modules at a flow agent, the traffic module collecting source, destination, and data-amount information from a send call, the local-information module accessing a Process IDentification (PID) for a process and finding information about one or more task-related properties with the PID, in accordance with examples.

Referring to FIG. 4, another flow agent 76h is depicted at an end host 14ap in a datacenter 32. The flow agent 76b is depicted as residing within user space 78b at the end host 14ap together with at least one additional application/program 100a implementing its threads and/or processes 102 in the user space 78b. Also, additional examples of a traffic module 80b and a local-information module 82b are depicted, providing additional details about the acquisition of traffic information and/or the acquisition of additional information local to the end host 14ap and relevant to execution of a datacenter job 46.

The traffic module 80b may, for example, include a modified send function 104 that may emulate one or more system calls. Non-limiting examples of such system calls in a LINUX operating system environment may include the send( ) call, sendto( ) call, and/or the sendmsg( ) call. As can be appreciated, depending on the example, the send function 104 may emulate other system calls for LINUX and/or other operating systems. In emulating such system calls, the modified send function 104 may be operable to provision 106 traffic information for a traffic flow 70/process from a send call 108a to a corresponding socket buffer 110a.

In addition to emulating one or more of these system calls, the modified send function 104 may be operable to copy 112 and/or acquire 112 source-destination information 88b for the traffic flow 70 or process from the send call 108a. By way of example and not limitation, in a LINUX environment where the system call is a send( ) or sendto( ) call, the modified send function 104 may acquire source-destination information 88b from the file descriptor of the sending socket provided by the 'sockfd' argument.

Furthermore, the modified send function 104 may also copy and/or acquire 114 information about the amount of data 86b being sent in a traffic flow 70 from the send call 108a. Returning to the non-limiting examples of the send( ) and sendto( ) calls in a LINUX environment, the modified send function 104 may acquire the amount and/or size of traffic 86b for a traffic flow/process 70 from the 'length' argument of these system calls. Having collected source-destination information 88b and/or a traffic amount/size 86a for a traffic flow/process 70, the traffic module 80b may provision this traffic information 116 to the report module 84b.

Aside from information about hardware elements 34, and/or other information that may be obtained by querying an end-host kernel 90, additional information relevant to the execution of a datacenter job 46 may also be obtained by a local-information module 82b in other ways. For example, classification information may be used to determine, without limitation and by way of example, what platforms, users, clusters, priorities, jobs 46, tasks, phases 48, and/or the like pertain to the traffic information 116 and/or hardware data provided to the log file 98b. Such information can be used to determine what performance characteristics are likely to obtain and/or what diagnostic issues are likely to arise across the datacenter 32 and/or at a particular end host 14 when one or more of the corresponding classifications apply.

The local-information module 82b and/or an identification module 118 may be operable to access an identifier locally available at an end host 14ap. The identifier may be used by the local-information module 82b and/or an identification module 118 to identify one or more job-related properties and/or classifications. One or both of these modules 82b/118 may map the identifier to an aspect of a distributed, parallel processing job 46 engaged in by a datacenter 32.

For example, the local-information module 82b and/or an identification module 118 may be operable to access job-implementation information by looking up 120 one or more values for a job-related property corresponding to the identifier. These values may be correlated and/or indexed to the identifier by one or more property files, tables, indices, dictionaries and/or the like 122a maintained by the local-information and/or identification modules 82b/118.

In some examples, the identifier may be a port number. In such examples, the local-information module 82b and/or an identification module 118 may access the port number for a socket over which the traffic from a traffic flow/process 70 is scheduled and/or sent. Returning again to the non-limiting examples of the send( ) and sendto( ) calls in a LINUX environment, one or more of these modules 82b/118 may acquire the port number from the source port identified by the 'sockfd' argument of the corresponding send call 108a. Additionally, or in the alternative, and without limitation, in some examples, an identifier may be a PID 124 for a process 102.

Where the identifier is a PID 124, in some examples, upon the running of a process, the identification module 82b/118 may retain the process information and/or the PID 124. As part of the process, one or more new sockets may be created. The new sockets may be associated with one or more source-destination pairs. In such examples, the identification module 82b/118 may retain the information for the one or more new sockets belonging to the process.

As discussed above, source and destination IP addresses, together with the PID, may be used to correlate the information with the process for reporting to the analytic controller for aggregation. Information corresponding to sockets with a common source-destination pair 88 may be reported by the corresponding report module 84b in a common report 98. The report module 84b may utilize different reports 98 for sockets with differing source-destination pairs 88 created by the process. The PID 124 may also be used to look up 120 classifications, properties, and/or aspects of the distributed, parallel processing job 46 engaged in by the datacenter 32.

The local-information and/or identification modules 82b/118 may provide information mapped to, corresponding to, indexed to, and/or correlated to the identifier about the classifications, properties, and/or aspects of the job 46 available at the end host 14. Additional information of global applicability, such as information identifying a priority assigned to a parallel processing job 46, may be received, collected, and/or maintained by a common analytic controller, discussed below, for later correlation/indexing to traffic flows 70/processes at the analytic controller.

Where the identifier plays a role in sending a traffic flow 70/process, information 126 about one or more classification, property, and/or aspect of the job 46 corresponding to the identifier may be correlated with the traffic flow 70/process. For example, the identifier may be the port over which the traffic flow 70/process is sent. Additionally, the identifier may be a PID 124 for a process 102 responsible for sending the traffic flow 70/process.

Furthermore, where hardware-resource information, such as hardware usage information, as provided by an end host's operating system/kernel 90, is indexed to one or more identifiers, the hardware resource information may also be indexed to traffic flow 70/process and/or classification, property, and/or aspect information 126. Hence, the identification module 118a may map the identifier to information 126 about one or more aspects of the distributed, parallel processing job 46 engaged in by a datacenter 32. For example, a hardware module 92 may correlate PID) information 124 found in a set of hardware usage statistics to different source-destination pairs 88 in a report 98. Consequently, a wide variety of classifications relevant to measuring the performance of a datacenter 32 and/or diagnosing issues within the datacenter 32 may be reported at a traffic-flow-based, or process-based, level of granularity from report modules 84 at flow agents 76 across the datacenter 32.

The traffic-flow-based, or processed-based, level of granularity may serve as a basis for achieving a balance between a manageable amount of data on one end and sufficient granularity on the other. Some additional classifications, properties, and/or aspects of the datacenter jobs 46 that may be collected by flow agents 76 are discussed below, together with other aspects involved in the creation of a data set uniquely reflective of datacenter metrics and/or uniquely useful in datacenter diagnostics.

Figure 5:
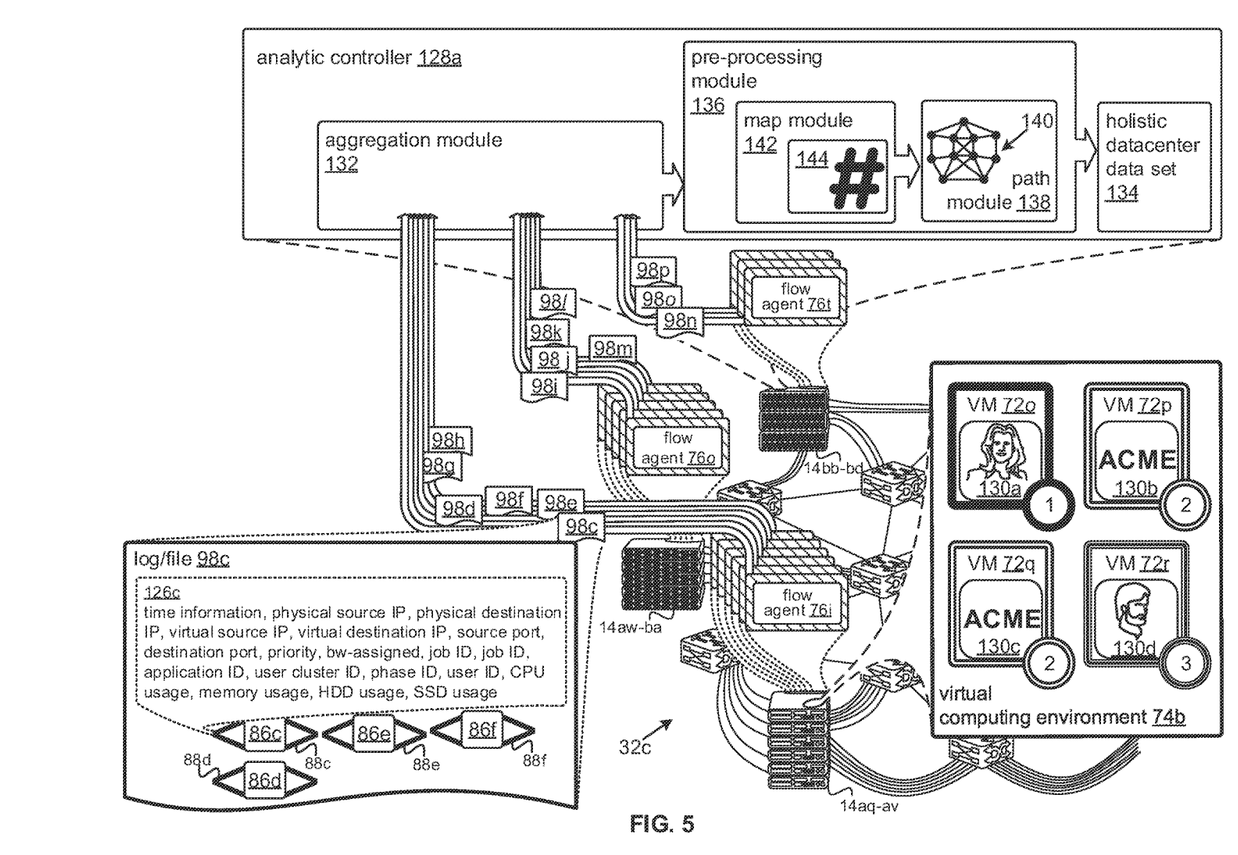
FIG. 5 is a schematic block diagram of multiple flow agents across a datacenter sending log files with traffic information and a wide variety of datacenter-task-implementation information local to the end hosts to an analytic controller for aggregation and pre-processing operations, such as path determination, in accordance with examples.

Referring to FIG. 5, multiple flow agents 76i-n, 76o-s, 76t-v are depicted across a datacenter 32c, residing at different end hosts 14aq-av, 14aw-ba, 14bb-bd. The flow agents 76i-n, 76o-s, 76t-v are depicted sending log files 98c-p with traffic information 116 and a wide variety of information 126 local to the end hosts 14aq-av, 14aw-ba, 14bb-bd to an analytic controller 128a. The analytic controller 128a may be operable to receive and/or to aggregate log files 98c-p from multiple end hosts 14aq-bd in the datacenter 32c into a data set 134 for datacenter diagnostics. Also depicted is a virtual computing environment 74b supported on an end host 14aq with multiple virtual computing instances and/or VMs 72o-r.

The processing and/or storage services of these virtual computing instances and/or VMs 72o-r may be assigned to different users and/or clients 130a-d of the datacenter 32c. Different resources within the datacenter 32c, such as VMs 72, can be assigned to different users 130a-d to execute jobs 46 provided by these users 130a-d. These resources may be grouped in different clusters/sub-clusters in the datacenter 32c.

In examples consistent with the depiction of FIG. 5, membership in different clusters within the datacenters 32c is indicated by the differing borders, i.e.: a single, thick-lined border; a double-lined border; and, a triple-lined border. Hence VM 72p and VM 72q, which share a double-lined border, may belong to a common cluster. Additionally, differing priorities can be assigned to different users 130, clusters, jobs 46, tasks, phases 48, and/or other aspects within a datacenter 32.

Such priority levels, depicted by the circled numbers at the lower right of the VMs 72o-r, potentially assigned to clusters and/or users 130a-d may have implications for the way in which resources, such as, without limitation, bandwidth, are allocated within the datacenter 32c. As discussed with respect to the previous FIG. 4, one or more identifiers and/or property files, tables, indices, dictionaries and/or the like 122 may be utilized to determine, correlate, and/or index a user 130, cluster, and/or priority level relevant to a given traffic flow 70/process, whether at a flow agent 76 or at an analytic controller 128.

In this way, performance and/or usage metrics may be collected for different users 130, clusters, and/or priority levels within the datacenter 32c at traffic-flow-based, or process-based, levels of granularity, which may be useful in diagnosing problems, anticipating future capabilities, assuring levels of service, optimizing the datacenter 32c, and/or meeting similar objectives. For example, by collecting information about traffic flows 70 associated with differing priority levels, a determination may be made that higher priority level traffic flows 70 are starving lower priority traffic flows 70. In another example, a determination may be made that traffic for the lower-priority levels can accommodate additional allocations of bandwidth to higher-priority levels.

By way of example, and not limitation, an exemplary log/file 98c, as sent from a flow agent 76i to the analytic controller 128a, is depicted. The log file 98c may carry traffic size/amount 86c-f information about multiple traffic flows/70 processes with corresponding source-destination information 88c-e and/or groups of traffic flows 70 sharing common source-destination information 88f. In addition to traffic size/amount information 86c-f, as depicted relative to the first unit of traffic size/amount information 86c, multiple additional forms of information and/or classifications 126c relevant to the execution of one or more jobs 46 in the datacenter 32c may be correlated, indexed, and/or combined with the unit of traffic size/amount information 86c.

For example, information about a job-related property 126 may include a cluster of nodes in the datacenter 32c on which a common, coordinated job 46 is undertaken. The information 126 may include an application 100 utilized by the common, coordinated job 46 and/or a job type involved in the common, coordinated job 46 undertaken by the datacenter 32c. In some examples, the job-related property information 126 may be a user IDentification for a user 130 initiating the job 46.

Non-limiting examples of such information are provided in the bubble extending from the first unit of source-destination information 88c. In some examples, one or more portions of the additional forms of information and/or classifications 126c may simply be provided in the log file 98c as corresponding to the end host 14aq at which the corresponding flow agent 76i resides. As depicted, the log file 98c, together with other log files 98d-p from other flow agents 76j-v, may arrive at an aggregation module 132 at the analytic controller 128a. The aggregation module 132 may combine reports 98c-p from across the datacenter 32c to create a holistic, datacenter data set 134.

In addition to combining the reports 98c-p, the analytic controller 128a may provide additional services toward the production of the holistic, datacenter data set 134. For example, the analytic controller may include a pre-processing module 136 that may filter and/or otherwise prepare the aggregated log files 98c-p to produce the resultant data set 134. Without limitation, the pre-processing module 136 may include a path module 138.

A path module 138 residing at the analytic controller 128a may be operable to maintain topology information 140. The topology information 140 may describe the topology of a datacenter 32c implementing a connection based approach to packet switching for traffic flows 70 within the datacenter 32c. Furthermore, the datacenter 32c may enforce common paths of nodes and edges traversed across the datacenter by traffic flows 70 with the same pair of a physical source and physical destination end hosts 14. In other words, different traffic flows 70, and/or traffic from a process, with the same source, physical IP address and the same destination, physical IP address traverse common edges and nodes across the datacenter 32c.

Therefore, the topology information 140 may index lists of edges and nodes traversed between combinations of a source, physical IP addresses and a destination, physical IP addresses. Such lists of edges and nodes may be imposed across multiple connections with a common combination of source and destination, in the connection-based approach to packet switching applied within the datacenter 32c. Hence, traffic flows 70 with common sources and destinations can describe common paths through the datacenter 32c.

By applying a source, physical IP address and a destination, physical IP address to the topology information 140, or vice-versa, the path module 138 may provide a list of edges and nodes traversed by a traffic flow 70, a portion of a traffic flow 70, and/or a group of traffic flows 70. The path module 138 may obtain the source, physical IP address and the destination, physical IP address from the source-destination information 88 provided by a report 98. Consequently, the path module 138 may extend the flow-level-based granularity to the granularity of individual nodes 12/14 and edges within the datacenter 32c. In other words, the traffic amount information 86 and/or additional forms of information and/or classifications 126c can be represented in the resultant data set 134 in terms of each node 12/14 and/or edge/link in the datacenter 32c for which they apply.

In some implementations, the traffic information and/or other information provided to an analytic controller 128 may be limited to the information associated with source and destination end hosts 14. In such examples, the implementation may be agnostic to the routing algorithm applied. As discussed above, in some of such implementations, the routing algorithm may be initially configured. However, other routing algorithms are possible, such as examples where traffic may be routed among a set number of paths for given physical and source destination.

As discussed above, traffic modules 80 may be operable to access source-destination information 88 for log files 98 in terms of the computing nodes from which a traffic flow/process 70 originates and at which it terminates. Where one or more of these computing nodes is a virtual computing instance 72, the source-destination information 88 may involve at least one virtual IP address. Several virtual computing nodes 72o-r are depicted in FIG. 5.

Virtual IP addresses and/or other forms of identification for virtual computing instances 72 may be important in diagnosing datacenter issues and/or providing datacenter metrics. These virtual IP addresses can correspond, respectively, to the source and the destination in a source-destination pair 88 in a log file 98. However, for reasons discussed below, physical IP addresses may play an important role in determining paths for traffic flows 70.

As can be appreciated, since a single physical node 14aq can host multiple virtual nodes 72, these different virtual computing instances 72 o-r can greatly outnumber the physical end hosts 14 in the datacenter 32d. Including such large numbers of virtual nodes 72 in the topology information 140 could greatly increase the size of the topology information 140 to be stored and could slow down the determination of paths from source-destination information 88.

Furthermore, virtual computing instances/VMs 72 may tend to be more dynamic, experiencing changes, such as being created and destroyed, more frequently than physical nodes. Since physical nodes may involve more effort to change, they may be changed less often. Consequently, topology information 140 based on virtual nodes, such as virtual computing instances/VMs 72, may involve more, maintenance, changes, and updating than topology information 140 restricted to describing physical nodes. Nevertheless, restricting a datacenter 32 to physical nodes would preclude the many advantages and flexibility provided by virtual computing instances/VMs 72 as sources and/or destinations for IP transmissions.

The map module 142 may add additional factors of simplicity, therefore, by being operable to map destination, virtual IP addresses for these virtual computing instances 72*s*-*x* to the corresponding destination, physical IP addresses for the destination end hosts 14 supporting the destination virtual computing instances 72. In some examples, the map module 142 may maintain a hash 144 indexing virtual computing instances 72*s*-*x*/IP addresses to corresponding physical nodes/IP addresses. The map module 142 may provide physical IP addresses indicated by the hash 144 application against the topology information 140 in the path module 138.

Hence, the analytic controller 128*a* and/or the pre-processing module 136 may also include a map module 142. The map module 142 may be operable to map source and/or destination, virtual IP addresses for these virtual computing instances 72*s*-*x* to the corresponding source and/or destination, physical IP addresses for the source and/or destination end hosts 14 supporting the source and/or destination virtual computing instances 72. In some examples, the map module 142 may maintain a hash 144 indexing source and/or destination virtual computing instances 72*s*-*x* and/or addresses to corresponding physical end hosts 14 and/or IP addresses.

As can be appreciated, locating the map module 142 at the analytic controller 128*b* can simplify the system. In a counter scenario where individual flow agents 76 map virtual IP addresses to physical IP addresses messages may be required for each of hundreds or thousands of flow agents every time a change, such as an addition/deletion of a virtual entity 72, occurs. Where the map module 142 resides at the analytic controller 128, a single message can be sent from the analytic controller to the map module 142 from a flow agent 76 associated with the change.

The map module 142 may provide physical IP addresses indicated by the hash table 144 to the path module 138 for latter application against the topology information 140 in the analytic controller 128. Additionally, the map module 142 may maintain globally significant information indexed to, and/or correlated to an identifier provided in log files 98. The map module 142 may map globally significant information to traffic amounts 86 for individual units of source-destination information 88. Non-limiting examples of such globally pertinent information may include, without limitation, information identifying a priority assigned to a parallel processing job 46, a user ID for a user initiating the parallel processing job 46, an application 100 involved in implementing the parallel processing job 46, and/or an implementation phase 48 of the parallel processing job 46. Information of global applicability may be updated at the map module 142 of the analytic controller 128.

As a result of the aggregation, pre-processing, mapping, and/or path determination, the analytic controller 128 may produce a data set 134 for the datacenter 32. This data set 134 may combine both traffic and additional information local to an end host 14 at a flow-level, or near flow-level of granularity. The data set 134 may further be processed, such as by one or more distributed and/or parallel forms of processing. Such processing may be used to diagnose issues in the datacenter 32, better understand the implications for traffic and/or coordinated processing of various events, and/or the like.

Figure 6:
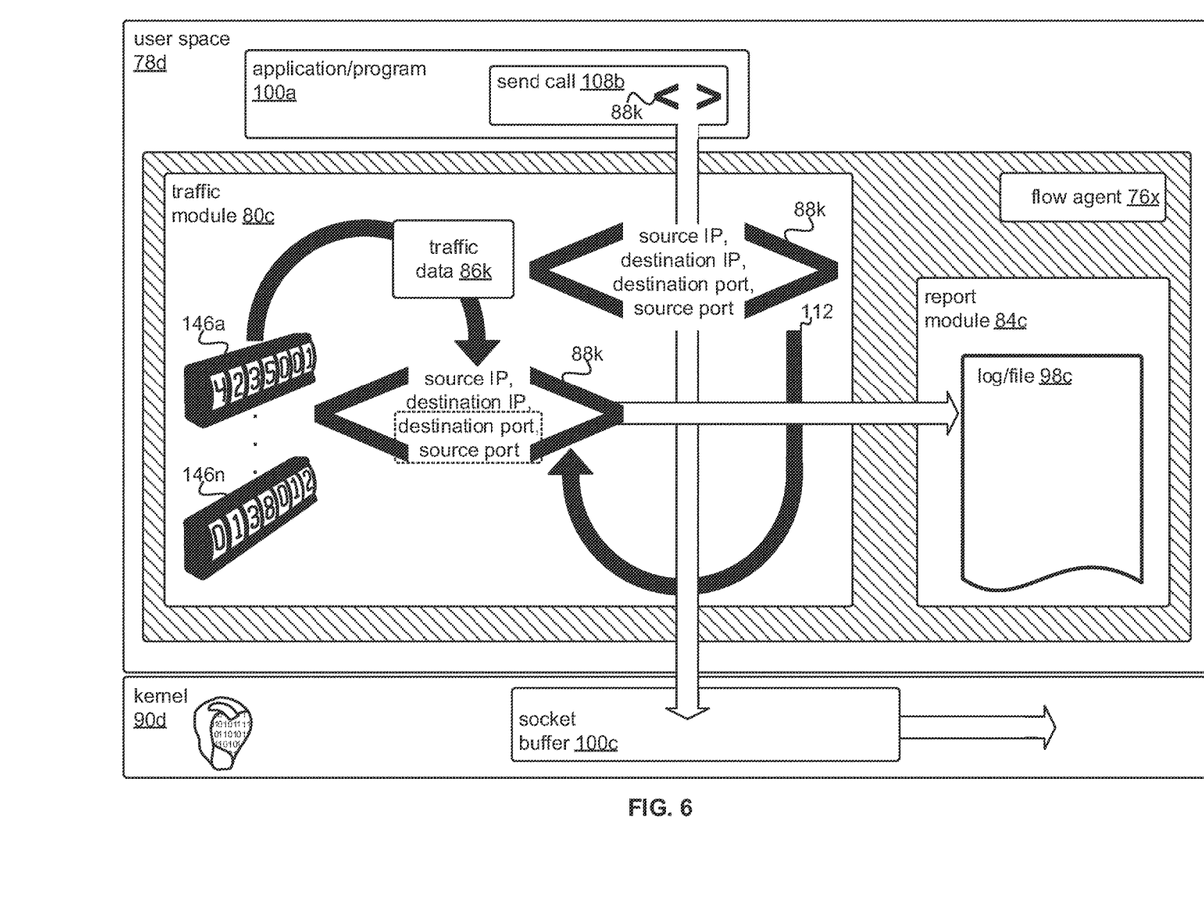
FIG. 6 is a schematic block diagram of a traffic module, at a flow agent, copying source and destination information from a send call and referencing a relevant counter to identify an amount of scheduled data, in accordance with examples.

Referring to FIG. 6, a flow agent 76*x* is depicted together with counters 146*a*-*n* that can be used to collect information included by a report module 84*c* in a log file 98*c*. Examples consistent with the figure may include an application/program 100*b* implemented in user space 78*d* that may make a send call 108*b* with corresponding source-destination information 88*k*. A traffic module 80*c*, and/or a modified send function 104, at the flow agent 76*x* may copy 112 the source-destination information 88*k* from the send call 108*b* to transfer data to a socket buffer 100*c*.

The traffic module 80*c*, and/or a modified send function 104, may increment a counter 146*a* with an amount of data, such as a number of bytes, to be sent in accordance with the send call 108*b*. The incremented counter 146*a* may be maintained for a specific unit of source-destination information 88*k* by the traffic module 80*c*, and/or a modified send function 104, as part of a set of counters 146*a*-*n* maintained by the traffic module 80*c*, and/or a modified send function 104. The various counters 146*a*-*n* may correspond to different, individual units of source-destination information 88. The traffic module 80*c*, and/or a modified send function 104, may be operable to reference the counter incremented 146*a* to track an amount of data sent from a common source to a common destination. Furthermore, in such examples, an identifier, as discussed above, may include a port number and/or a PID 92 for a process 102 sending data from a common source to a common destination tracked by the counter 146*a*.

Additionally, different, destinations may be intended for different sizes of traffic flows 70, as can be the case with the "big data" traffic commonly experienced by datacenters 32. "Big-data" traffic flows 70 are usually divided into two categories, "mice flows" and "elephant flows." Mice flows are short in duration and/or bursty, carrying relatively small amounts of data.

Conversely, elephant flows 70 may transfer larger amounts of information over longer periods of time. These elephant flows may transfer the majority of the data in a datacenter 32.

In some examples, due to their relatively less frequent occurrence and/or their relatively large impact on traffic and/or overall performance in a datacenter 32, each elephant flow may be reported on individually, both in terms of its size and, potentially, in terms of other qualities, within the log file 98*c*. However, traffic flows 70 transferring amounts of data classifiable as a mouse file, due to their frequency and/or their individual low impact on traffic and/or the datacenter 32 may be combined. In such examples, the counters 146 can be used to sum amounts of data transferred during multiple mice flows with common source-destination information 88. The presence of multiple counters 146*a*-*n* indexed to different units of source-destination information 88 may be implemented to aggregate data on small traffic flows/processes 70.

The foregoing example is non-limiting and provided for purposes of illustrating an example application of counters 146 to collecting datacenter data at an end host 14. However, counters 146 can be used to aggregate and/or sum information about any of the classifications and/or usage metrics discussed above. In some examples, such counters 146 may be provided by a flow agent 76. Also, in some examples, counters 146 local to the end host 14 may be accessed.

Figure 7:
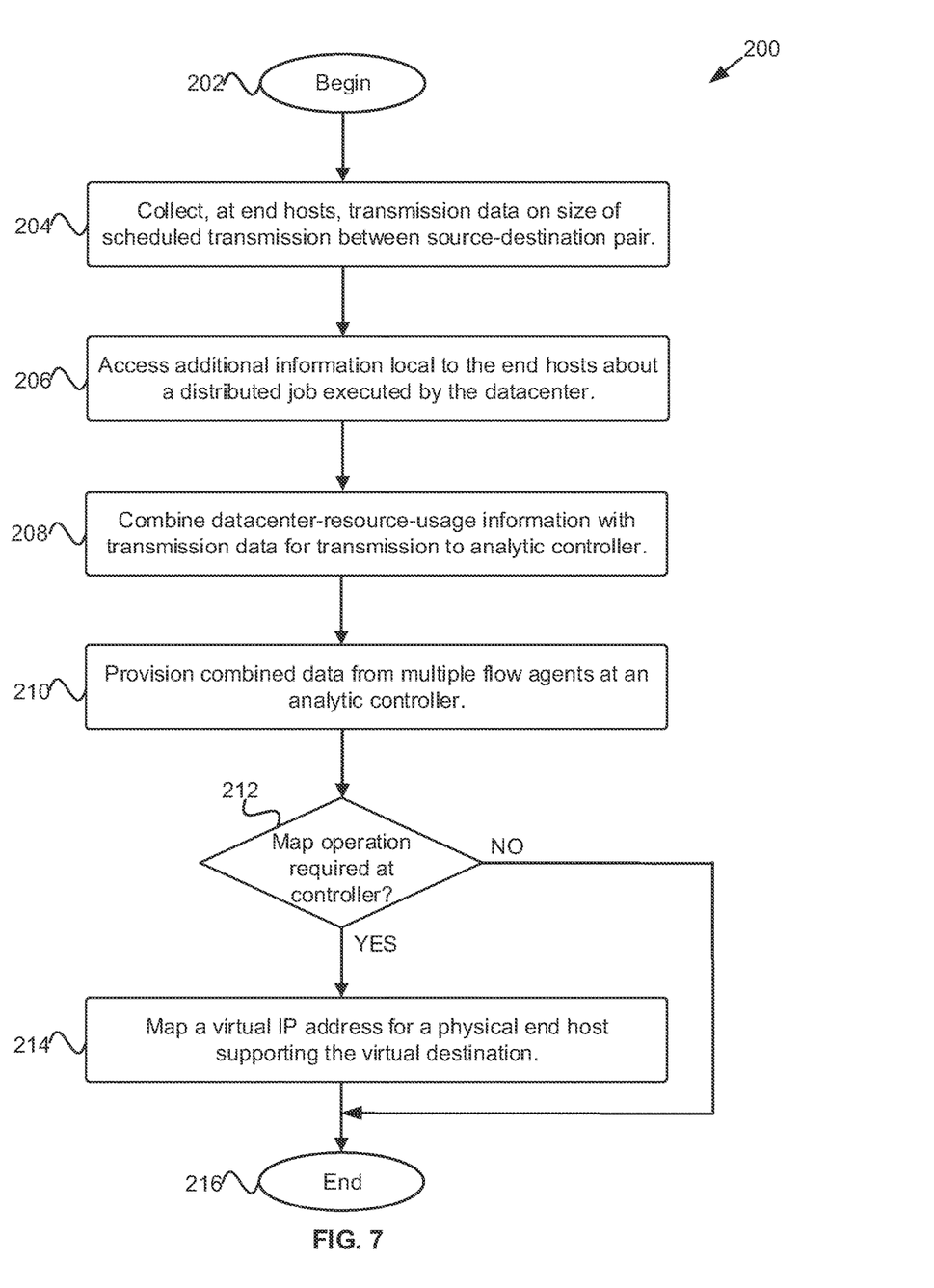
FIG. 7 is a flow chart of steps for acquiring data with which to measure datacenter performance and diagnose datacenter issues, in accordance with examples.

Referring to FIG. 7, methods 200 for tracking datacenter utilization are depicted. The flowchart in FIG. 7 illustrates the architecture, functionality, and/or operation of possible implementations of systems, methods, and computer program products according to examples. In this regard, each block in the flowchart may represent a module, segment, or portion of code, which comprises one or more executable instructions for implementing the specified logical function(s). It will also be noted that each block of the flowchart illustrations, and combinations of blocks in the flowchart illustrations, may be implemented by special purpose hardware-based systems that perform the specified functions or acts, or combinations of special purpose hardware and computer instructions.

Where computer program instructions are involved, these instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block or blocks. These computer program instructions may also be stored in a computer readable medium that may direct a computer to function in a particular manner, such that the instructions stored in the computer-readable medium produce an article of manufacture including instruction means which implement the function/act specified in the flowchart and/or block or blocks. The computer program may also be loaded onto a computer to cause a series of operation steps to be performed on the computer or other programmable apparatus to produce a computer implemented process for the functions/acts specified in the flowchart and/or block or blocks.

It should also be noted that, in some alternative implementations, the functions noted in the blocks may occur out of the order noted. In certain embodiments, two blocks shown in succession may, in fact, be executed substantially concurrently, or the blocks may sometimes be executed in the reverse order, depending upon the functionality involved. Alternatively, certain steps or functions may be omitted.

Methods 200 consistent with FIG. 7 may begin 202 by end hosts 14 in a datacenter 32 collecting 204 transmission data. The transmission data may report amounts of data scheduled for transmission between source-destination pairs 88 in the datacenter 32. Flow agents 76 at these end hosts 14 may also access 206 additional information 126 local to the end hosts about a distributed job 46 executed by the datacenter 32. In such examples, the data transmitted between source-destination pairs 88 may also pertain to the distributed job 46.

The flow agents 76 may combine 208 the transmission data with the additional information local to the end hosts 14 in files 98 specific to the individual end hosts 14 for transmission to an analytic controller 128. The flow agents 76 may provision 210 the files 98 with the combined data to a common analytic controller 128.

In some examples, a source-destination pair 88 may include a virtual destination, such as a virtual computing instance 72, or VM 72. In such examples, a physical destination is used to determine a path through a datacenter 32 for a corresponding traffic flow/process 70. In such examples, a form of identification, such as a physical IP address, for the physical end host 14 supporting the virtual destination may be acquired. A determination 212 is first made, at the analytic controller 128, as to whether to map a virtual destination to an identification for the physical end host 14 supporting the destination 72.

Where the answer is yes, the analytic controller 128, and/or map module 142 at the analytic controller 128, may map 214 source and/or destination, virtual IP addresses to a source and/or destination, physical IP addresses. The source and/or destination, physical IP addresses in such examples may be assigned to end host(s) 14 supporting virtual computing instance(s) 72 assigned to the source and/or destination, virtual IP addresses. The flow agent 76 may link the source and/or destination, physical IP addresses to transmission data reporting an amount of data sent to the destination, virtual IP address from a common source in a file 98 for reporting to the analytic controller 128.

Where the answer to the previous determination 208 is no, methods 200 may skip to the step of mapping 214 one or more virtual entities. Some methods 200 may end 216 at this point. Others may continue.

In some examples of such methods 200, collecting 204 transmission data may further involve maintaining, by a flow agent 76, a counter 146 operable to increment when data is sent between a common source-destination pair 88. The counter 146 may then be checked to identify an amount of data transmitted from the end host 14 and corresponding to a common source-destination pair 88.

The analytic controller 128a, in some examples of such methods 200, may apply a source-destination pair 88 to graph data 140 at the analytic controller 128a. The graph data 140 may provide physical topology information for the datacenter 32. The source-destination pair 88 may provide information including a source, physical IP address and the destination, physical IP address. The destination, physical IP address may correspond to an end host 14 supporting the destination, virtual physical IP address. In these examples, the datacenter 32 may employ a connection based approach to packet switching that enforces a common path of predefined nodes and edges across the datacenter for connections sharing a common source, physical IP address and a common destination, physical IP address. Hence, these methods 200 may determine a path through the datacenter 200 for the common source-destination pair 88 from the graph data 140.

One of more flow agents 76 may access an identifier for a property describing a characteristic of at least a portion of a distributed job 46 being executed in the datacenter 32. The identifier may be accessible at an end host 14 supporting the flow agent 76. Also, such a flow agent 76 may correlate the identifier to a value for the property constituting information local to the corresponding end host 14. The value may be indexed to the identifier in an index 122 maintained by the flow agent 76. The property describing the characteristic of at least a portion of the distributed job 46 may be an application 100 responsible for data transmitted between a source-destination pair 88, a task type responsible for the data transmitted between the source-destination pair 88, and/or a user ID for a user 130 of the datacenter 130 initiating the distributed job 46.

In some examples, one or more flow agents 76 may query an operating system. The operating system may provide an interface with end-host hardware 34 for an end host 14 supporting the flow agent 76. The flow agent 76 may query the operating system for one or more hardware usage measurements. Also, additional disclosures described as systems above may also be implemented as methods.

The present disclosures may be embodied in other specific forms without departing from their spirit or essential characteristics. The described examples are to be considered in all respects only as illustrative, not restrictive. The scope of the invention is, therefore, indicated by the appended claims, rather than by the foregoing description. All changes within the meaning and range of equivalency of the claims are to be embraced within their scope.

The invention claimed is:

1. A system for providing data for diagnosing datacenter issues, comprising:
   multiple end hosts in a datacenter, each operable to at least one of store and process data and comprising a Network Interface Controller (NIC) operable for data transmission across the datacenter in accordance with a coordinated job undertaken by the datacenter; and multiple flow agents, each flow agent residing at an end host, a flow agent comprising:
  a traffic module operable to correlate an amount of traffic scheduled to both of a traffic flow and a process having a process identifier (PID), the traffic flow being generated by the end host on which the each flow agent resides by the process executing on the end host on which the each flow agent resides, the end host not being an intermediary node between a destination and a source of the traffic flow and the process executing a distributed job received by the end host;
  a local-information module operable to access additional job-implementation information for the coordinated job and locally accessible at a corresponding end host, the additional job-implementation information including hardware usage data of the process having the PID, the hardware usage data including usage by the process of hardware resources including a Central Processing Unit (CPU), Random Access Memory (RAM), and at least one of a Hard Disc Drive (HDD) and a Solid State Drive (SSD);
  a report module operable to correlate the amount of traffic sent with the additional job-implementation information in a log file;
  an operating system supporting hardware resources at the corresponding end host;
  the hardware resources comprising the Central Processing Unit (CPU), Random Access Memory (RAM), and the at least one of a Hard Disc Drive (HDD) and the Solid State Drive (SSD); and
  a usage module residing at the flow agent operable to access at least a portion of the job-implementation information by querying the operating system for hardware usage data corresponding to the PID for all of the hardware resources.

2. The system of claim 1, the local-information module operable to access the additional job-implementation information, at least in part, by identifying the source-destination pair by at least one of the PID and a port number corresponding to the source-destination pair.

3. The system of claim 1 further comprising:
an analytic controller operable to aggregate log files from the multiple end hosts in the datacenter into a data set for datacenter diagnostics;
the report module further operable to send the log file to the analytic controller; and
a path module residing at the analytic controller, the path module operable to:
  maintain topology information for the datacenter that indexes lists of edges and nodes traversed between combinations of source, physical IP addresses and destination, physical IP addresses, in a connection based approach to packet switching imposing a list across multiple connections with a common combination,
  provide a list of edges and nodes traversed by applying the source, physical IP address and the destination, physical IP address to the topology information.

4. The system of claim 3, further comprising a map module at the analytic controller, the map module operable to map at least one of a source, virtual IP address and a destination, virtual IP address to at least one or a source, physical IP address and a destination, physical IP address with a hash maintained by the map module.

5. The system of claim 4, wherein the map module is further operable to map at least one of a traffic flow and a process to at least one of a user IDentification for a user initiating the coordinated job and a priority associated with the coordinated job.

6. The system of claim 1, further comprising an identification module operable to:
access an identifier for a job-related property; and
access the additional job-implementation information by looking up a value for the job-related property indexed to the identifier in a property file maintained by the identification module.

7. The system of claim 6, wherein the identifier is the PID for the process, the process creating a new socket associated with the source-destination pair.

8. The system of claim 6, wherein at least one of the identification module and/or the map module are operable to look up at least one additional job-related property that comprises at least one of a cluster of nodes in the datacenter on which the coordinated job is undertaken, an application utilized by the coordinated job undertaken, and a job type for the coordinated job undertaken by the datacenter.

9. A method for tracking datacenter utilization, the method comprising:
collecting, by flow agents residing at end hosts in a datacenter, transmission data reporting amounts of data transmitted between source-destination pairs in the datacenter, each end host not being an intermediary node between the source-destination pairs, each end host executing a process performing one of a plurality of tasks of a distributed, parallel processing job;
accessing, by the flow agents, additional information local to each end host about the process executed by the each end host, the additional information including utilization of a Central Processing Unit (CPU), Random Access Memory (RAM), and at least one of a Hard Disc Drive (HDD) and a Solid State Drive (SSD) by the process;
correlating, by the flow agents, the transmission data with the additional information local to the end hosts in files specific to the individual end hosts;
provisioning, by the flow agents, the files to a common analytic controller.

10. The method of claim 9, wherein collecting transmission data further comprises:
maintaining, by a flow agent, a counter operable to increment when data is scheduled between a common source-destination pair; and
checking the counter to identify an amount of data scheduled for the corresponding common source-destination pair.

11. The method of claim 9, further comprising
mapping, by the common analytic controller, at least one of a source, virtual Internet Protocol (IP) address and a destination, virtual IP address to at least one of a source, physical IP address and a destination, physical IP address, the at least one physical IP address being assigned to at least one end host supporting at least one virtual computing instance assigned to at least one of the source, virtual IP address and the destination, virtual IP address.

12. The method of claim 11, further comprising:
applying a source, physical IP address and the destination, physical IP address for a source-destination pair to graph data at the analytic controller; and
determining a path through the datacenter for the source-destination pair from the graph data, the datacenter employing a connection based approach to packet switching that enforces a common path of pre-defined nodes and edges across the datacenter for connections sharing a common source, physical IP address and a common destination, physical IP address.

13. The method of claim 9, further comprising:
accessing, by a flow agent, an identifier for a characteristic of at least a portion of the distributed job, the identifier accessible at an end host supporting the flow agent; and
correlating the identifier to a value for the characteristic, the value indexed to the identifier in an index maintained by the flow agent.

14. The method of claim 13, wherein the characteristic of at least a portion of the distributed job comprises at least one of an application responsible for data transmitted between a source-destination pair, a task type responsible for the data transmitted between the source-destination pair, a user IDentification (ID) for a user of the datacenter initiating the distributed job.

15. The method of claim 9, further comprising querying, by a flow agent, an operating system for at least one hardware measurement, the operating system providing an interface with end-host hardware for the end host supporting the flow agent.

16. A system for job-centric tracking of datacenter usage, comprising:
multiple end hosts comprising hardware networked in a datacenter, the multiple end hosts providing distributed computing resources for a distributed, parallel processing job;
multiple flow agents, each flow agent residing on an end host among the multiple end hosts, each flow agent comprising:
a traffic module operable to determine an amount of data sent from a common source to a common destination by a process executing on the end host on which the each flow agent resides, the end host on which the each flow agent resides not being an intermediary node between the common source and the common destination, the process being part of a distributed parallel processing job;
a hardware module operable to:
query an operating system for hardware statistics of the process;
provide a set of hardware statistics of the process inclusion with the report; and
a report module operable to combine and correlate the amount of data sent for a source-destination pair with the hardware statistics of the process in a report; and
an analytic controller operable to receive and aggregate reports from the multiple end hosts into a diagnostic data set for the datacenter, the analytic controller comprising a map module operable to map at least one of a source, virtual Internet Protocol (IP) address and a destination, virtual IP address to at least one of a source, physical IP address and a destination, physical IP address;
wherein the map module is further operable to:
access an identifier comprising at least one of a port number and a Process IDentifier (PID) for a process sending data from a common source to a common destination;
map the identifier to an aspect of the distributed, parallel processing job; and
provide information mapped to the identifier about the aspect for inclusion with the amount of data sent and the source-destination pair in the report, the information identifying an implementation phase of the distributed, parallel processing job.

17. The system of claim 16, wherein
the map module is further operable to update information used to map a virtual Internet Protocol(IP) address to a physical IP address.

* * * * *